US010214072B2

(12) United States Patent
Miyakoshi et al.

(10) Patent No.: US 10,214,072 B2
(45) Date of Patent: Feb. 26, 2019

(54) VEHICLE AIR CONDITIONING APPARATUS

(71) Applicant: SANDEN CORPORATION, Gunma (JP)

(72) Inventors: Ryo Miyakoshi, Isesaki (JP); Kenichi Suzuki, Isesaki (JP)

(73) Assignee: SANDEN HOLDINGS CORPORATION, Isesaki-shi (JP)

(*) Notice: Subject to any disclaimer, the term of this patent is extended or adjusted under 35 U.S.C. 154(b) by 484 days.

(21) Appl. No.: 14/352,555

(22) PCT Filed: Oct. 10, 2012

(86) PCT No.: PCT/JP2012/076229
§ 371 (c)(1),
(2) Date: Apr. 17, 2014

(87) PCT Pub. No.: WO2013/058154
PCT Pub. Date: Apr. 25, 2013

(65) Prior Publication Data
US 2014/0245767 A1     Sep. 4, 2014

(30) Foreign Application Priority Data

Oct. 17, 2011   (JP) ................................. 2011-227599

(51) Int. Cl.
*B60H 1/00*     (2006.01)
*F25B 6/04*     (2006.01)
*F25B 40/00*    (2006.01)

(52) U.S. Cl.
CPC ..... *B60H 1/00021* (2013.01); *B60H 1/00785* (2013.01); *B60H 1/00835* (2013.01);
(Continued)

(58) Field of Classification Search
CPC .............. B60H 1/0005; B60H 1/00885; B60H 2001/3261; B60H 2001/3258;
(Continued)

(56) References Cited

U.S. PATENT DOCUMENTS 5,615,560 A    4/1997  Inoue
5,632,156 A *  5/1997  Takeo .................. B60H 1/3205
                                                       62/160

(Continued)

FOREIGN PATENT DOCUMENTS

GB          325590    2/1930
GB         2 395776   6/2004
(Continued)

OTHER PUBLICATIONS

Salsbury, Fault detection in HVAC systems using model-based feedforward control, 2001, Elsevier—Energy and Buildings.*

*Primary Examiner* — Frantz Jules
*Assistant Examiner* — Nelson Nieves
(74) *Attorney, Agent, or Firm* — Cozen O'Connor (57) ABSTRACT

A vehicle air conditioning apparatus can ensure that the temperature of the air supplied to the vehicle interior is a preset temperature by securing the quantity of heat release for the radiator during a cooling and dehumidifying operation. The valve opening of the condensing pressure regulating part of the first control valve is smaller when the calculated opening SW of the air mix damper is equal to or more than the predetermined value than when the opening SW is smaller than the predetermined value. Accordingly, when the quantity of heat release is not sufficient in the radiator, it is possible to increase the condensing pressure of the refrigerant in the radiator to raise the temperature of the refrigerant in the radiator. Consequently, it is possible to secure the amount of heating, and therefore to ensure that the (Continued)

temperature of the air supplies to the vehicle interior is a preset temperature.

10 Claims, 9 Drawing Sheets

(52) U.S. Cl.
CPC ........... *B60H 1/00885* (2013.01); *F25B 6/04* (2013.01); *F25B 40/00* (2013.01); *F25B 2313/0293* (2013.01); *F25B 2313/0294* (2013.01); *F25B 2400/0403* (2013.01); *F25B 2400/0409* (2013.01); *F25B 2400/0411* (2013.01); *F25B 2400/0417* (2013.01); *F25B 2400/0419* (2013.01); *F25B 2600/111* (2013.01); *F25B 2600/112* (2013.01); *F25B 2700/1931* (2013.01); *F25B 2700/1933* (2013.01); *F25B 2700/2104* (2013.01); *F25B 2700/2106* (2013.01); *F25B 2700/2117* (2013.01); *F25B 2700/21151* (2013.01); *F25B 2700/21152* (2013.01); *F25B 2700/21171* (2013.01)

(58) Field of Classification Search
CPC ............ B60H 1/00021; B60H 1/00785; B60H 1/00835; B60H 2001/3285; F25B 6/04; F25B 40/00; F25B 2700/1931; F25B 2313/0294; F25B 2400/0409; F25B 2400/0411; F25B 2400/0417; F25B 2313/0293; F25B 2600/111; F25B 2600/112

See application file for complete search history.

(56) References Cited

U.S. PATENT DOCUMENTS

| | | | | |
|---|---|---|---|---|
| 5,634,348 A | * | 6/1997 | Ikeda | B60H 1/3205 62/160 |
| 5,701,753 A | | 12/1997 | Iritani | |
| 5,782,102 A | * | 7/1998 | Iritani | B60H 1/00814 62/197 |
| 6,035,653 A | * | 3/2000 | Itoh | B60H 1/3207 62/176.5 |
| 6,430,951 B1 | * | 8/2002 | Iritani | B60H 1/00021 62/160 |
| 6,505,475 B1 | * | 1/2003 | Zugibe | F25B 49/02 62/126 |
| 7,905,098 B2 | * | 3/2011 | Pham | F04C 28/00 62/126 |
| 2002/0197949 A1 | * | 12/2002 | Kampf | B60H 1/008 454/75 |
| 2004/0079096 A1 | * | 4/2004 | Itoh | B60H 1/00735 62/223 |
| 2004/0129012 A1 | * | 7/2004 | Feuerecker | B60H 1/00914 62/278 |
| 2006/0086117 A1 | * | 4/2006 | Lee | B60H 1/3211 62/228.1 |
| 2008/0295530 A1 | * | 12/2008 | Sawada | B60H 1/3205 62/129 |
| 2008/0295532 A1 | * | 12/2008 | Sawada | F25B 49/02 62/228.3 |
| 2011/0005255 A1 | * | 1/2011 | Tanihata | B60H 1/00785 62/238.7 |
| 2011/0048671 A1 | * | 3/2011 | Nishikawa | B60H 1/00885 165/42 |
| 2012/0198869 A1 | * | 8/2012 | Morita | B60H 1/3208 62/126 |

FOREIGN PATENT DOCUMENTS

| | | |
|---|---|---|
| JP | 6-341732 | 12/1994 |
| JP | 7-285318 | 10/1995 |
| JP | 8-282263 | 10/1996 |
| JP | 9-14780 | 1/1997 |
| JP | 2001-324237 | 11/2001 |
| JP | 2002-130870 | 5/2002 |
| JP | 2004-155299 | 6/2004 |

* cited by examiner

VEHICLE AIR CONDITIONING APPARATUS

RELATED APPLICATIONS

This a U.S. National stage of International application No. PCT/JP2012/076229 filed on Oct. 10, 2012.

This patent application claims the priority of Japanese application no. 2011-227599 filed Oct. 17, 2011, the disclosure content of which is hereby incorporated by reference.

TECHNICAL FIELD

The present invention relates to a vehicle air conditioning apparatus applicable to, for example, electric cars.

BACKGROUND ART

Conventionally, this sort of vehicle air conditioning apparatus includes: a compressor driven by an engine as a power source of a vehicle; a radiator provided outside the vehicle; and a heat exchanger provided inside the vehicle interior. With this vehicle air conditioning apparatus, a cooling operation is performed by: releasing the heat from the refrigerant discharged from the compressor in the radiator; absorbing the heat into the refrigerant in the heat exchanger; and supplying the air subjected to a heat exchange with the refrigerant in the heat exchanger to the vehicle interior. In addition, such a conventional vehicle air conditioning apparatus includes a heater core and perform a heating operation by: releasing the exhaust heat from the cooling water used to cool the engine in the heater core; and blowing the air subjected to a heat exchange with the cooling water in the heater core to the vehicle interior. Moreover, such a conventional vehicle air conditioning apparatus performs a heating and dehumidifying operation by: cooling the air to be supplied to the vehicle interior to a required absolute temperature in the heat exchanger for dehumidification; heating the cooled and dehumidified air in the heat exchanger to a desired temperature in the heater core; and blowing the heated air to the vehicle interior.

The above-mentioned vehicle air conditioning apparatus uses the exhaust heat from the engine as a heat source to heat the air for a heating operation, or a heating and dehumidifying operation. Generally, an electric car uses an electric motor as a power source, and it is difficult to acquire the exhaust heat that can heat the air by using the electric motor without an engine. Therefore, the above-mentioned vehicle air conditioning apparatus is not applicable to electric cars.

To address this issue, there has been known a vehicle air conditioning apparatus which is applicable to electric cars. The vehicle air conditioning apparatus includes: a compressor configured to compress and discharge a refrigerant; a radiator configured to release the heat from a refrigerant; a heat exchanger configured to absorb the heat into the refrigerant; an outdoor heat exchanger configured to release the heat from or absorb the heat into the refrigerant; and a cooling/cooling and dehumidifying refrigerant circuit configured to allow the refrigerant discharged from the compressor to flow into the radiator, to allow the refrigerant to flow into the outdoor heat exchanger, to allow the refrigerant to flow into the heat exchanger via the expansion part and to allow the refrigerant to be sucked into the compressor (see, for example, Patent literature 1).

CITATION LIST

Patent Literature

PTL1: Japanese Patent Application Laid-Open No. 2001-324237

SUMMARY OF INVENTION

Technical Problem

In the cooling/cooling and dehumidifying refrigerant circuit of the vehicle air conditioning apparatus applicable to electric cars, the refrigerant discharged from the compressor flows through the outdoor heat exchanger after flowing through the radiator. The refrigerant discharged from the compressor releases the heat in each of the radiator and the outdoor heat exchanger. Here, the quantity of heat release in each of the radiator and the outdoor heat exchanger varies depending on the quantity of the air subjected to a heat exchange with the refrigerant flowing through each of the radiator and the outdoor heat exchanger. Therefore, when the quantity of the air subjected to a heat exchange with the refrigerant flowing through the outdoor heat exchanger provided outside the vehicle increases, for example, as in the case in which the vehicle is moving, the quantity of heat release increases in the outdoor heat exchanger, but decreases in the radiator. When the quantity of heat release decreases in the radiator daring a cooling and dehumidifying operation, it is not possible to heat the air having been cooled and dehumidified in the heat exchanger up to a target temperature, and therefore it is difficult to ensure that the temperature of the vehicle interior is a preset temperature.

It is therefore an object of the present invention to provide a vehicle air conditioning apparatus that can ensure that the temperature of the air supplied to the vehicle interior is a preset temperature by securing the quantity of heat release required in the radiator during a cooling and dehumidifying operation.

Solution to Problem

To achieve the object of the invention, a vehicle air conditioning apparatus includes: a compressor configured to compress and discharge a refrigerant; a radiator provided in an air flow passage that allows air to be supplied to a vehicle interior to flow through and configured to release heat from the refrigerant; a heat exchanger provided in the air flow passage in an upstream of air flow from the radiator and configured to absorb the heat into the refrigerant; an outdoor heat exchanger provided outside the vehicle and configured to release the heat from the refrigerant; and an air mix damper having an opening and configured to be able to change a percentage of the air flowing through the air flow passage that is subjected to a heat exchange with the refrigerant flowing through the radiator, wherein: when the opening of the air mix damper is greater, the percentage of the air subjected to the heat exchange with the refrigerant increases; and the refrigerant discharged from the compressor releases the heat in the radiator and the outdoor heat exchanger while flowing first through the radiator, and next through the outdoor heat exchanger, and is decompressed by an expansion valve and absorbs the heat in the heat exchanger, so that the air having been cooled in the heat exchanger is heated in the radiator, and then supplied to the vehicle interior. The vehicle air conditioning apparatus further includes: a refrigerant flow regulating valve provided in a refrigerant flow passage between the radiator and the outdoor heat exchanger and configured to regulate an amount of the refrigerant flowing through the refrigerant flow passage; a target air-blowing temperature calculation part configured to calculate a target air-blowing temperature that is a temperature of the air to be supplied to the vehicle interior required to ensure that the temperature of the vehicle interior is a preset temperature; a heated air temperature detection part configured to detect a temperature of the air after being heated in the radiator; a cooled air temperature detection part configured to detect a temperature of one air after being cooled in the heat exchanger; an opening calculation part configured to calculate the opening of the air mix damper, based on the temperature calculated by the target air-blowing temperature calculation part, the temperature detected by the heated air temperature detection part and the temperature detected by the cooled air temperature detection part; and a valve opening control part configured to control a valve opening of the refrigerant flow regulating valve such that the valve opening of the refrigerant flow regulating valve is smaller when the valve opening calculated by the valve opening calculation part is equal to or more than a predetermined value than when the valve opening calculated by the valve opening calculation part is smaller than the predetermined value.

By this means, the condensing pressure of the refrigerant in the radiator is increased, and therefore the quantity of heat release in the radiator is increased. Consequently, it is possible to secure the amount of heating, which is required to heat the air blowing to the vehicle interior.

With the present invention, when the quantity of heat release is not sufficient in the radiator, it is possible to increase the condensing pressure of the refrigerant in the radiator to raise the temperature of the refrigerant in the radiator. By this means, it is possible to secure the amount of heating, which is required to heat the air blowing to the vehicle interior, and therefore to ensure that the temperature of the air supplied to the vehicle interior is a preset temperature.

DESCRIPTION OF EMBODIMENTS

FIGS. 1 to 8 show an embodiment of the present invention.

Figure 1:
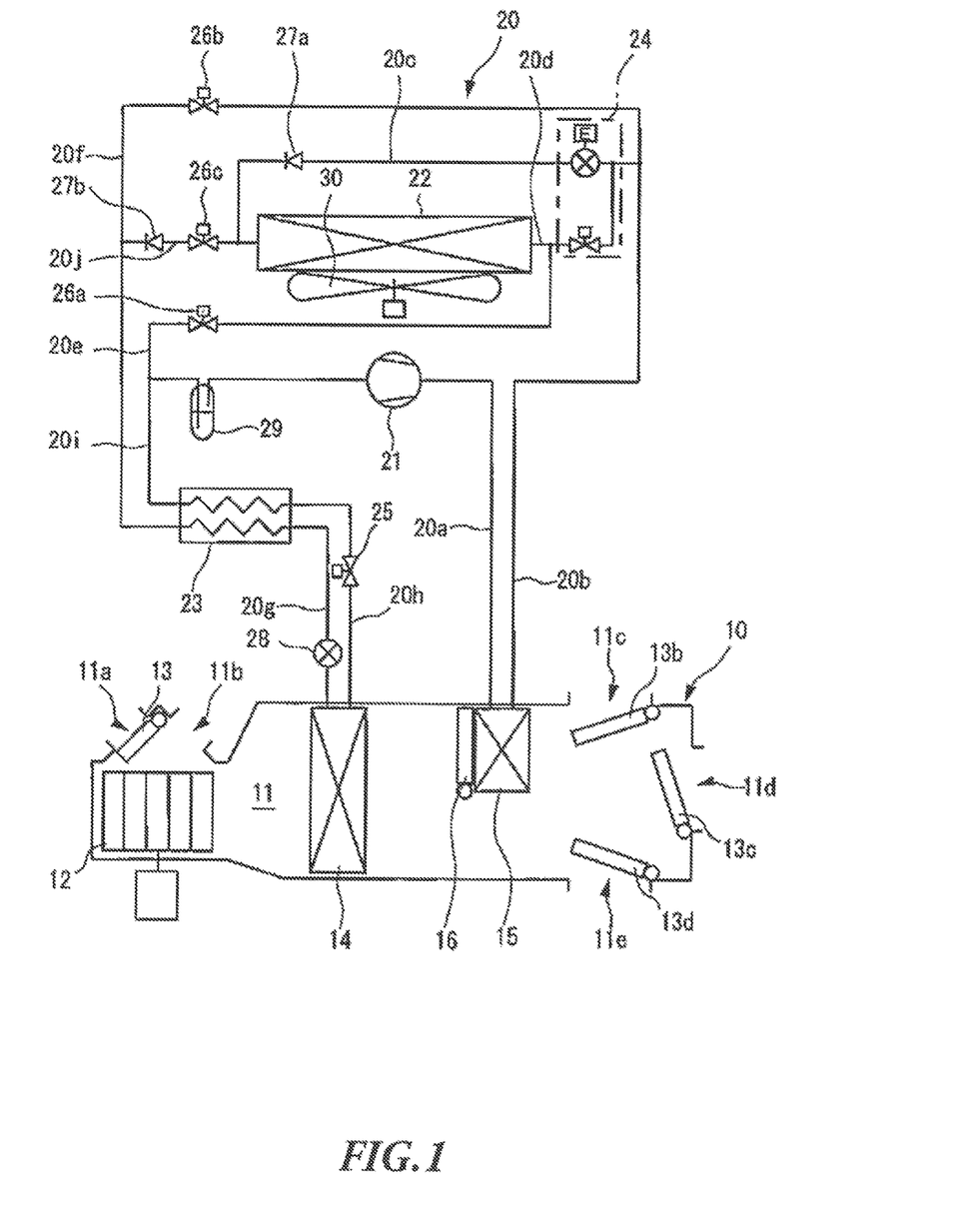
FIG. 1 is a schematic view showing a vehicle air conditioning apparatus according to an embodiment of the present invention.

As shown in FIG. 1, the vehicle air conditioning apparatus according to the present invention includes an air conditioning unit 10 provided in the vehicle, and a refrigerant circuit 20 formed across the vehicle interior and the outdoor.

The air conditioning unit 10 includes an air flow passage 11 that allows the air to foe supplied to the vehicle interior to flow through. An outdoor air inlet 11a and an indoor air inlet 11b are provided in the first end side of the air flow passage 11. The outdoor air inlet 11a is configured to allow the outdoor air to flow into the air flow passage 11, and the indoor air inlet 11b is configured to allow the indoor air to flow into the air flow passage 11. Meanwhile, a foot outlet 11c, event outlet 11d and a defroster outlet 11e are provided in the second end side of the air flow passage 11. The foot outlet 11c is configured to allow the air flowing through, the air flow passage 11 to blow to the feet of the passengers in the vehicle. The vent outlet 11d is configured to allow the air flowing through the air flow passage 11 to blow to the upper bodies of the passengers in the vehicle. The defroster outlet 11e is configured to allow the air flowing through the air flow passage 11 to blow to the interior surface of the front window.

An indoor fan 12 such as a sirocco fan configured to allow the air to flow through the air flow passage 11 from end to end is provided in the first end side of the air flow passage 11. This indoor fan 12 is driven by an electric motor 12a.

Also, in the first end side of the air flow passage 11, an inlet switching damper 13 configured to open one of the outdoor air inlet 11a and the indoor air inter 11b and to close the other. This inlet switching damper 13 is driven by an electric motor 13a. When the inlet switching damper 13 closes the indoor air inlet 11b and opens the outdoor air inlet 11a, the mode is switched to an outdoor air supply mode in which the air flows from the outdoor air inlet 11a into the air flow passage 11. Meanwhile, when the inlet switching damper 13 closes the outdoor air inlet 11a and opens the indoor air inlet 11b, the mode is switched to an indoor air circulation mode in which the air flows from the indoor air inlet 11b into the air flow passage 11. Moreover, when the inlet switching damper 13 is placed between the outdoor air inlet 11a and the indoor air inlet 11b and the outdoor air inlet 11a and the indoor air inlet 11b open, the mode is switched to a two-way mode in which the air flows from both the outdoor air inlet 11a and the indoor air inlet 11b into she air flow passage 11 according to the opening ratio of the outdoor air inlet 11a and the indoor air inlet 11b.

Outlet switching dampers 13b, 13c and 13d configured to open and close the foot outlet 11c, the vent outlet 11d and the defroster outlet 11e are provided in the foot outlet 11c, the vent outlet 11d and the defroster outlet 11e, respectively, in the second side of the air flow passage 11. These outlet switching dampers 13b, 13c and 13d are configured to move together by a linkage (not shown) and are opened and closed by an electric motor 13e. Here, when the outlet switching dampers 13b, 13c and 13d open the foot outlet 1c, close the vent outlet 11d and slightly open the defroster outlet 11e, most of the air flowing through the air flow passage 11 blows out of the foot outlet 11c and the remaining air blows out of the defroster outlet 11e. This mode is referred to as "foot mode." Meanwhile, when the outlet switching dampers 13b, 13c and 13d close the foot outlet 11c and the defroster outlet 11e, and open the vent outlet 11d, all the air flowing through the air flow passage 11 blows out of the vent outlet 11d. This mode is referred to as "vent mode." In addition, when the outlet switching dampers 13b, 13c and 13d open the foot outlet 11c and the vent outlet 11d, and close the defroster outlet 11e, the air flowing through the air flow passage 11 blows out of the foot outlet 11c and the vent outlet 11d. This mode is referred to as "bi-level mode." Moreover, when the outlet switching dampers 13b, 13c and 13d close the foot outlet 11c and the vent outlet 11d, and open the defroster outlet 11e, the air flowing through the air flow passage 11 blows out of the defroster outlet 11e. This mode is referred to as "defroster mode." Furthermore, when the outlet switching dampers 13b, 13c and 13d close the vent outlet 11d and open the foot outlet 11c and the defroster outlet 11e, the air flowing through the air flow passage 11 blows out of the foot outlet 11c and the defroster outlet 11e. This mode is referred to as "defroster-foot mode." Here, in the bi-level mode, the air flow passage 11, the foot outlet 11c, the vent outlet 11d, and a heat exchanger and a radiator which will be described later, are arranged and configured such that the temperature of the air blowing out of the foot outlet 11c is higher than the temperature of the air blowing out of the vent outlet 11d.

A heat exchanger 14 is provided in the air flow passage 11 in the downstream of the air flow from the indoor fan 12. The heat exchanger 14 is configured to cool and dehumidify the air flowing through the air flow passage 11. In addition, a radiator 15 is provided in the air flow passage 11 in the downstream of the air flow from the heat exchanger 14. The radiator 15 is configured to heat the air flowing through the air flow passage 11. The heat exchanger 14 and the radiator 15 are heat exchangers, each of which is constituted by fins and tubes and which is configured to perform a heat exchange between the refrigerant flowing therethrough and the air flowing through the air flow passage 11.

An air mix damper 16 is provided between the heat exchanger 14 and the radiator 15 in the air flow passage 11 and is configured to control the percentage of the air to be heated, which is flowing through the air flow passage 11. The air mix damper 16 is driven by an electric motor 16a. When the air mix damper 16 is disposed in the air flow passage 11 in the upstream of the radiator 15, the percentage of the air subjected to a heat exchange in the radiator 15 is reduced. Meanwhile, when the air mix damper 16 is moved to a position other than the radiator 15 in the air flow passage 11, the percentage of the air subjected to a heat exchange is increased. In the air flow passage 11, when the air mix damper 16 closes the upstream side of the radiator 15 and opens the portion other than the radiator 15, the opening is 0%, and, on the other hand, when the air mix damper 16 opens the upstream side of the radiator 15 and closes the portion other than the radiator 15, the opening is 100%.

The refrigerant circuit 20 includes: the heat exchanger 14; the radiator 15; a compressor 21 configured to compress a refrigerant; an outdoor heat exchanger 22 configured to perform a heat exchange between the refrigerant and the outdoor air; an indoor neat exchanger 23 configured to perform a heat exchange between the refrigerant flowing out of the heat exchanger 14 and the refrigerant flowing out of the radiator 15 and the outdoor heat exchanger 22, or at least of the radiator 15; a first control valve 24 including an expansion part configured to decompress the refrigerant flowing into the outdoor heat exchanger 22 during the heating operation, and a condensing pressure regulating part, as a refrigerant flow regulating valve, configured to regulate the condensing pressure of the refrigerant in the radiator during the cooling and dehumidifying operation; a second control valve 25 configured to regulate the evaporating temperature of the refrigerant in the heat exchanger 14; first to third solenoid valves 26a, 26b and 26c; first and second, check valves 27a and 27b, an expansion valve 28 as an indoor side expansion valve; and an accumulator 29 configured to separate refrigerant liquid from refrigerant vapor to prevent the refrigerant liquid from being sucked into the compressor 21. These components are connected to each other by a copper pipe or an aluminum pipe.

To be more specific, input side of the radiator 15 into which the refrigerant flows is connected to the output side of the compressor 21 from which the refrigerant is discharged to form a refrigerant flow passage 20a. Meanwhile, the input side of the first control valve 24 into which the refrigerant flows is connected to the output side of the radiator 15 from which the refrigerant is discharged, thereby to form a refrigerant flow passage 20b. The first end side of the outdoor heat exchanger 22 is connected to the output side of the expansion part of the first control valve 24 from which the refrigerant is discharged, thereby to form a refrigerant flow passage 20c. The first check valve 27a is provided in the refrigerant flow passage 20c. Meanwhile, the second end side of the outdoor heat exchanger 22 is connected to the output side of the condensing pressure regulating part of the first control valve 24 from which the refrigerant discharged, thereby to form a refrigerant flow passage 20d. The suction side of the compressor 21 into which the refrigerant is sucked is connected to the second end side of the outdoor heat exchanger 22, in parallel with the refrigerant flow passage 20d, thereby to form a refrigerant flow passage 20e. The first solenoid valve 26a and the accumulator 29 are provided in the refrigerant flow passage 20e in the order from the upstream of the flow of the refrigerant. The input side of the indoor heat exchanger 23 into which a high-pressure refrigerant flows is connected to the refrigerant flow passage 20b, thereby to form a refrigerant flow passage 20f. The second solenoid valve 26b is provided in the refrigerant flow passage 20f. The input side of the heat exchanger 14 into which the refrigerant flows is connected to the output side of the indoor heat exchanger 23 from which the high-pressure refrigerant is discharged, thereby to form a refrigerant flow passage 20g. The expansion valve 28 is provided in the refrigerant flow passage 20g. The input side of the indoor heat exchanger 23 into which a low-pressure refrigerant flows is connected to the output side of the heat exchanger 14 from which the refrigerant is discharged, thereby to form a refrigerant flow passage 20h. The second control valve 25 is provided in the refrigerant flow passage 20h. The part of the refrigerant flow passage 20e between the first solenoid valve 26a and the accumulator 29 is connected to the output side of the indoor heat exchanger 23 from which the low-pressure refrigerant is discharged, thereby to form a refrigerant flow passage 20i. Part of the refrigerant flow passage 20f located downstream from the second solenoid valve 26b in the refrigerant flow direction is connected to the first end side of the outdoor heat exchanger 22, in parallel with the refrigerant flow passage 20c, thereby to form a refrigerant flow passage 20j. The third solenoid valve 26c and the second check valve 27b are provided in the refrigerant flow passage 20j in the order from the upstream of the refrigerant flow direction.

The compressor 21 and the outdoor heat exchanger 22 are disposed outside the vehicle. The compressor 21 is driven by the electric motor 21a. The outdoor heat exchanger 22 includes an outdoor fan 30 configured to perform a heat exchange between the outdoor air and the refrigerant while the vehicle stops. The outdoor fan 30 is driven by an electric motor 30a.

In the first control valve 24, a refrigerant flow channel to the expansion part and a refrigerant flow channel to the condensing pressure regulating part are formed. The refrigerant flow channels to the expansion part and the condensing pressure regulating part can be completely closed by valves that regulate the openings of the refrigerant flow channels, respectively.

The valve opening of the second control valve 25 can be switched between two different degrees, so that the second control valve 25 can regulate the amount of the refrigerant flowing through the refrigerant flow passage 20h between two levels.

The expansion valve 28 is a thermostatic expansion valve provided to appropriately maintain the superheat of the refrigerant flowing through the refrigerant flow passage 20h in the output side of the heat exchanger 14 from which the refrigerant is discharged.

Moreover, the vehicle air conditioning apparatus also includes a controller 40 that controls the temperature and the humidity of the vehicle interior to be the preset temperature and humidity.

The controller 40 includes a CPU, a ROM and a RAM. In the controller 40, upon receiving an input signal from a device connected to the input side, the CPU reads a program stored in the ROM according to the input signal, stores the state detected by the input signal on the RAM and transmits an output signal to a device connected to the output side.

Figure 2:
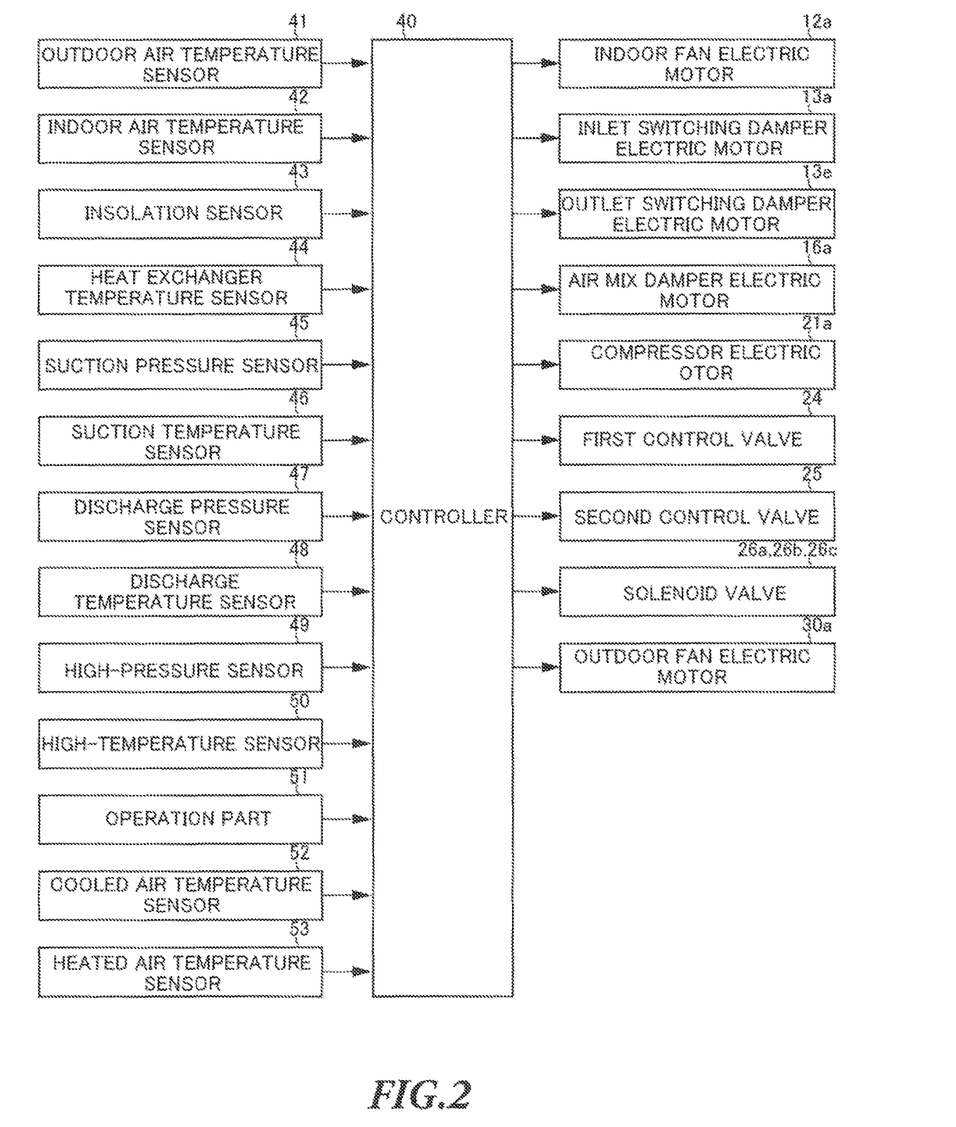
FIG. 2 is a block diagram shoving a control system.

As shown in FIG. 2, the electric motor 12a for driving the indoor fan 12; the electric motor 13a for driving the inlet switching damper 13; the electric motor 13e for driving the outlet switching campers 13b, 13c and 13d; the electric motor 16a for driving the air mix damper 16; the electric motor 21a for driving the compressor 21; the first control valve 24; the second control valve 25; the first to third solenoid valves 26a, 26b and 26c and the electric motor 30a for driving the outdoor fan 30 are connected to the output side of the controller 40.

As shown in FIG. 2, an outdoor air temperature sensor 41 configured to detect outdoor temperature Tam; an indoor air temperature sensor 42 configured to detect indoor air temperature Tr; an insolation sensor 43 such as a photo sensor configured to detect amount of insolation Ts; a heat exchanger temperature sensor 44, as temperature detection means, configured to detect evaporating temperature Te of the refrigerant in the heat exchanger 14; a suction pressure sensor 45 configured to detect the pressure of the refrigerant sucked into the compressor 21; a suction temperature sensor 46 configured to detect the temperature of the refrigerant sucked into the compressor 21; a discharge pressure sensor 47 configured to detect the pressure of the refrigerant discharged from the compressor 21; a discharge temperature sensor 48 configured to detect the temperature of the refrigerant discharged from the compressor 21; a high-pressure sensor 49 configured to detect the pressure of the high-pressure refrigerant flowing through the refrigerant flow passage 20b; a high-temperature sensor 50 configured to detect temperature TH of the high-pressure refrigerant flowing through the refrigerant flow passage 20b; an operation part 51 configured to set modes regarding to target preset temperature Tset and the switching of the operation; a cooled air temperature sensor 52, as cooled air detection means, configured to detect temperature Te of the air after being cooled in the heat exchanger 14; and a heated air temperature sensor 53, as heated air temperature detection means, configured to detect temperature TH of the air after being heated in the radiator 15, are connected to the input side of the controller 40.

The vehicle air conditioning apparatus having the above-described configuration performs cooling operation, cooling and dehumidifying operation, heating operation, first heating and dehumidifying operation, ant second heating and dehumidifying operation. Now, each operation will be explained.

Figure 3:
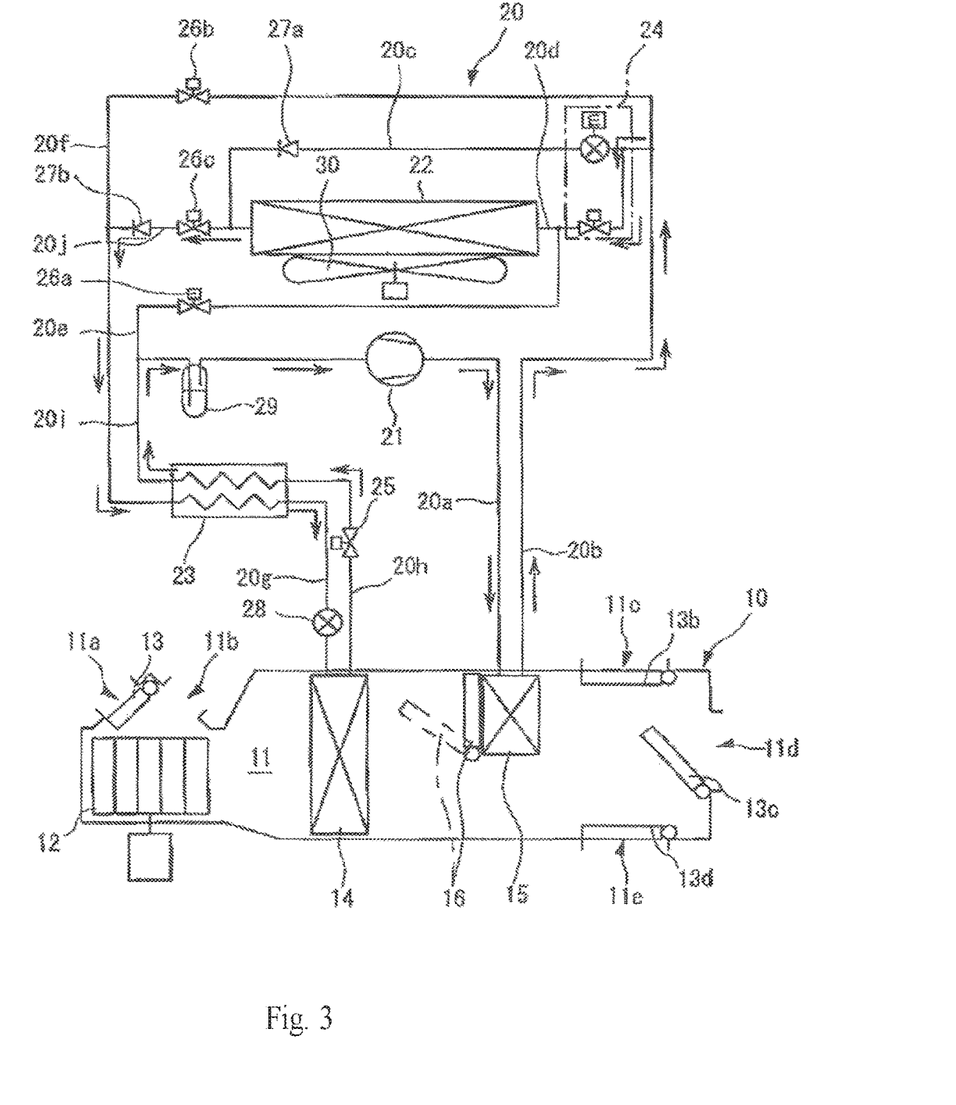
FIG. 3 is a schematic view showing the vehicle air conditioning apparatus performing a cooling operation and a cooling and dehumidifying operation.

During the cooling and dehumidifying operation, in the refrigerant circuit 20, the refrigerant flow channel to the expansion part is closed while the refrigerant flow channel to the condensing pressure regulating part is open in the first control valve 24; the third solenoid valve 26c is opened; the first and second solenoid valves 26a and 26b are closed; and compressor 21 is operated. By this means, as shown in FIG. 3, the refrigerant discharged from the compressor 21 flows through in this order: the refrigerant flow passage 20a; the radiator 15; the refrigerant flow passages 20b and 20d; the outdoor heat exchanger 22; the refrigerant flow passages 20j and 20f; the high-pressure side of the indoor heat exchanger 23; the refrigerant flow passage 20g; the heat exchanger 14, the refrigerant flow passage 20h; the low pressure side of the indoor heat exchanger 23; and the refrigerant flow passages 20i and. 20e, and is sucked into the compressor 21. During the cooling operation, the refrigerant flowing through the refrigerant circuit 20 releases the heat in the outdoor heat exchanger 22 and absorbs the teat in the neat exchanger 14. During the cooling and dehumidifying operation, when the air mix damper 16 is opened as represented by the dashed-dotted line of FIG. 3, the refrigerant flowing through the refrigerant circuit 20 releases the heat also in the radiator 15.

In this case, in the air conditioning unit 10 during the cooling operation, the indoor fan 12 is operated to flow the air through the air flow passage 11, and the air is subjected to a heat exchange with the refrigerant in the heat exchanger 14 and cooled. The temperature of the cooled air becomes target air-blowing temperature TAO, which is the temperature of the air to be blown out of the outlets 11c, 11d and 11e to the vehicle interior, in order to set the temperature of the vehicle interior to the target preset temperature Tset. The target air-blowing temperature TAO is calculated based on the preset temperature Tset, and environmental conditions including the outdoor air temperature Tam, the indoor air temperature Tr, and an amount of insolation Ts, which are detected by the outdoor air temperature sensor 41, the indoor air temperature sensor 42, and the insolation sensor 43, respectively (target air-blowing temperature calculation means).

Meanwhile, in the air conditioning unit 10 during the cooling and dehumidifying operation, the indoor fan 12 is operated to flow the air through the air flow passage 11, and the air is subjected to a heat exchange with the refrigerant which absorbs the heat in the heat exchanger 14, and therefore is cooled and dehumidified. The air having been dehumidified in the heat exchanger 14 is subjected to a heat exchange with the refrigerant which releases the heat in the radiator 15, and therefore heated. As a result, the air at the target air-blowing temperature TAO blows to the vehicle interior.

Figure 4:
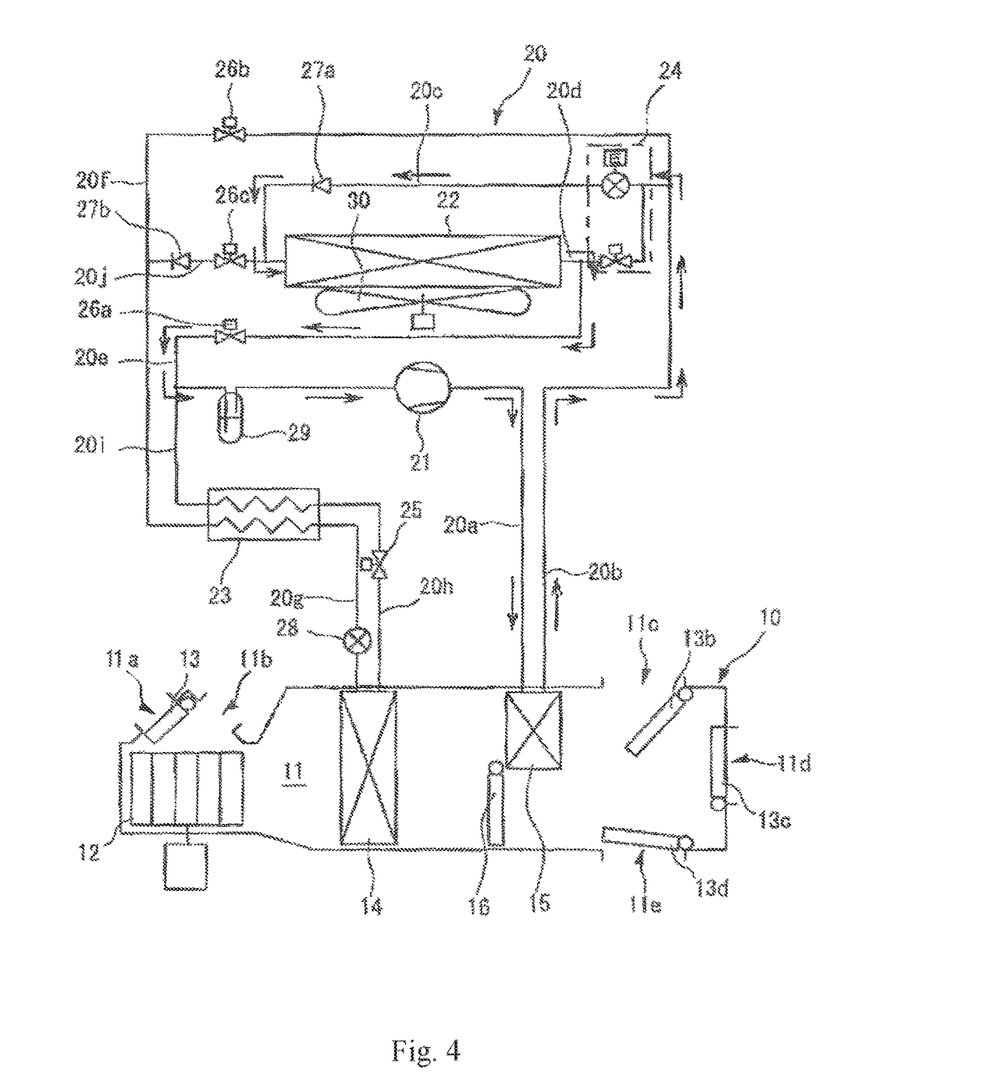
FIG. 4 is a schematic view showing the vehicle air conditioning apparatus performing a heating operation.

During the heating operation, in the refrigerant circuit 20, the refrigerant flow channel to the expansion part is open while the refrigerant flow channel to the condensing pressure regulating part is closed in the first control valve 24; the first solenoid valve 26a is opened; the second and third solenoid valves 26b and 26c are closed; and the compressor 21 is operated. By this means, as shown in FIG. 4, the refrigerant discharged from the compressor 21 flows through in this order: the refrigerant flow passage 20*a*; the radiator 15; the refrigerant flow passages 20*b* and 20*c*; the outdoor heat exchanger 22; and the refrigerant flow passage 22*e*, and is sucked into the compressor 21. The refrigerant flowing through the refrigerant circuit 20 releases the heat in the radiator 15 and absorbs the heat in the outdoor heat exchanger 22.

In this case, in the air conditioning unit 10, the indoor fan 12 is operated to flow the air through the air flow passage 11, and the flowing air is not subjected to a heat exchange with the refrigerant in the heat exchanger 14, but is subjected to a heat exchange with the refrigerant in the radiator 15 and therefore is heated. As a result, the air at the target air-blowing temperature TAO blows to the vehicle interior.

Figure 5:
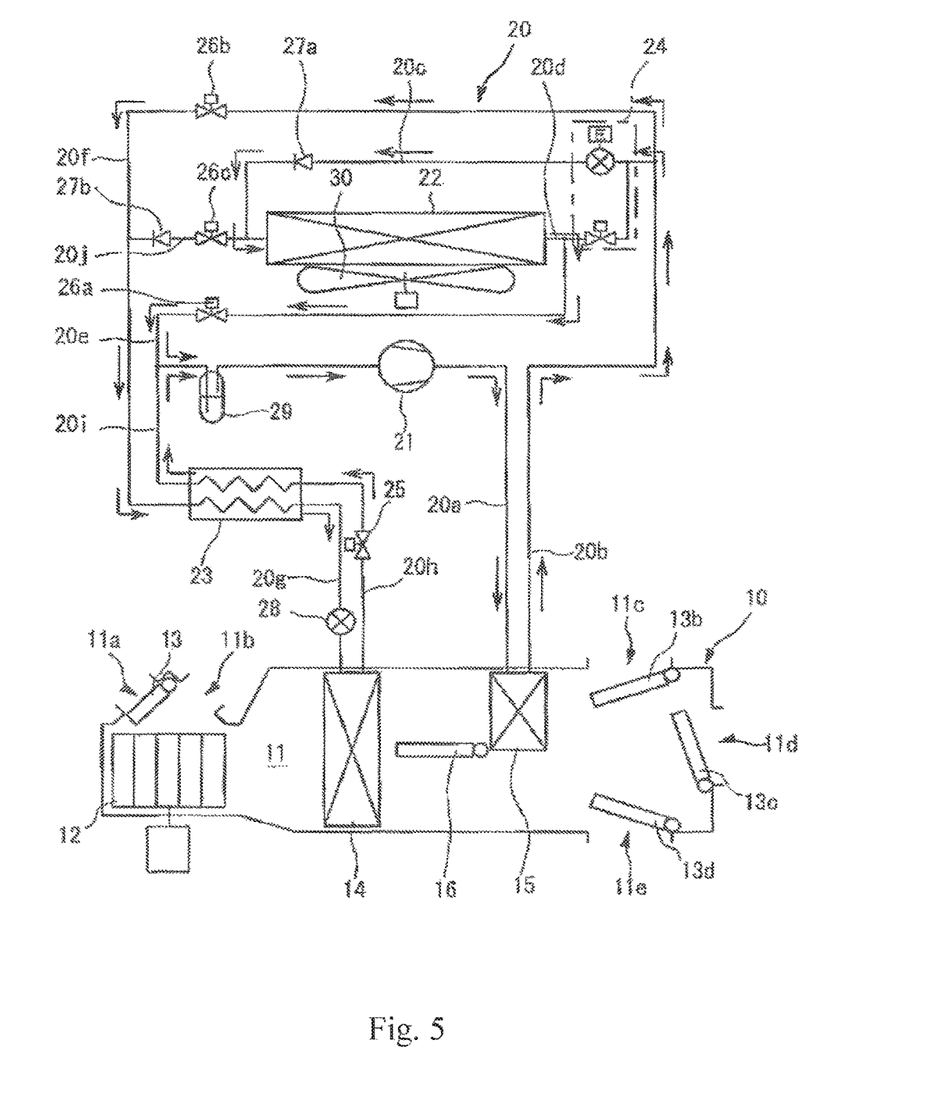
FIG. 5 is a schematic view showing the vehicle air conditioning apparatus performing a first heating and dehumidifying operation.

During the first heating and dehumidifying operation, in the refrigerant circuit 20, the refrigerant flow channel to the expansion part of the first control valve 24 is open while the refrigerant flow channel to the condensing pressure regulating part is closed; the first and second, solenoid valves 26*a* and 26*b* are opened; the third solenoid valve 26*c* is closed; and the compressor 21 is operated. By this means, as shown in FIG. 5, the refrigerant discharged from the compressor 21 flows through in this order: the refrigerant flow passage 20*a*; the radiator 15; and the refrigerant flow passage 20*b*. Part of the refrigerant having passed through the refrigerant flow passage 20*b* flows through in this order: the first control valve 24; the refrigerant flow passage 20*c*; the outdoor heat exchanger 22; and the refrigerant flow passage 20*e*, and is sucked into the compressor 21. Meanwhile, the remaining refrigerant having passed through the refrigerant flow passage 20*b* flows through in this order: the refrigerant flow passage 20*f*; the high-pressure side of the indoor heat exchanger 23; the refrigerant flow passage 20*g*; the heat exchanger 14; the refrigerant flow passage 20*h*; the low-pressure side of the indoor heat exchanger 23; and the refrigerant flow passage 20*i*, and is sucked into the compressor 21. The refrigerant flowing through the refrigerant circuit 20 releases the heat in the radiator 15 and absorbs the heat in the heat exchanger 14 and the outdoor heat exchanger 22.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified. Part of the air having been dehumidified in the heat exchanger 14 is subjected to a heat exchange with the refrigerant in the radiator 15 and heated. As a result, the air at the target air-blowing temperature TAO blows into the vehicle interior.

Figure 6:
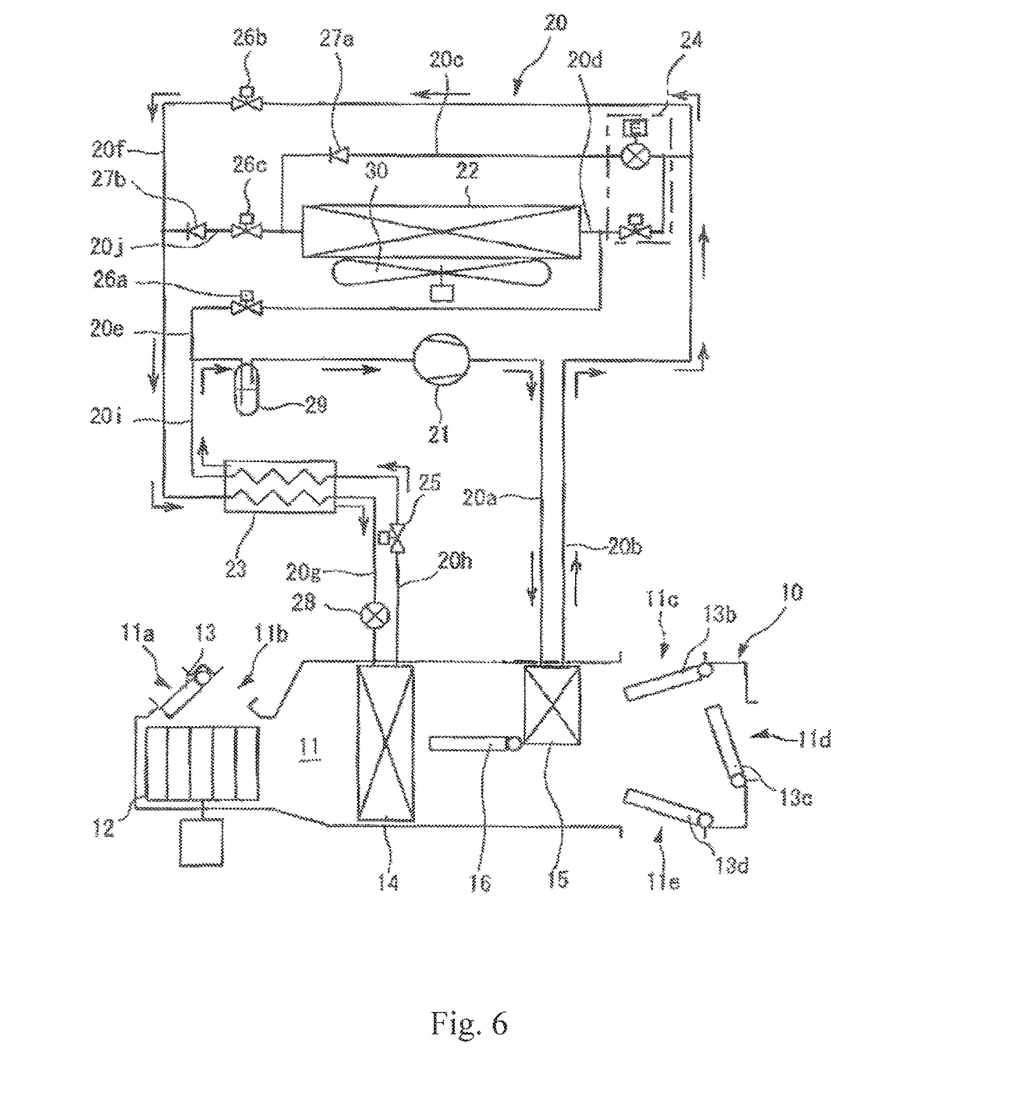
FIG. 6 is a schematic view showing the vehicle air conditioning apparatus performing a second heating and dehumidifying operation.

During the second heating and dehumidifying operation, in the refrigerant circuit 20, both the refrigerant flow channel to the expansion part and the refrigerant flow channel to the condensing pressure regulating part are closed in the first control valve 24; the second solenoid valve 26*b* is opened; and the first and third solenoid valves 26*a* and 26*c* are closed, and the compressor 21 is operated. By this means, as shown in FIG. 6, the refrigerant discharged from the compressor 21 flows through in this order: the refrigerant flow passage 20*a*; the radiator 15; the refrigerant flow passages 20*b* and 20*f*; the high-pressure side of the indoor heat exchanger 23; the refrigerant flow passage 20*g*; the heat exchanger 14; the refrigerant flow passage 20*h*; the low-pressure side of the indoor heat exchanger 23; and the refrigerant flow passages 20*i* and 20*e*, and is sucked into the compressor 21. The refrigerant flowing through the refrigerant circuit 20 releases the heat in the radiator 15 and absorbs the heat in the heat exchanger 14.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified in the same way as in the first heating act dehumidifying operation. Part of the air dehumidified in the heat exchanger 14 is subjected to a heat exchange with the refrigerant in the radiator 15, and therefore heated. As a result, the air at the target air-blowing temperature TAO blows to the vehicle interior.

While an automatic switch is turned on, the controller 40 performs as operation switching control process to switch the operation among the cooling operation, the cooling and dehumidifying operation, the heating operation, the first heating and dehumidifying operation, and the second heating and dehumidifying operation, based on environmental conditions including the outdoor air temperature Tam, the indoor air temperature Tr, the outdoor air humidity, the indoor air humidity Th, the amount of insolation Ts and so forth.

The controller 40 switches the mode of the outlets 11*c*, 11*d* and 11*e* by using the outlet switching dampers 13*b*, 13*c* and 13*d*, and controls the opening of the air mix damper 16 in order to set the temperature of the air blowing out of the outlets 11*c*, 11*d*, and 11*e* to the target air-blowing temperature TAO.

The controller 40 switches the mode among the foot mode, the vent mode and the bi-level mode depending on the target air-blowing temperature TAO during each operation switched by the operation switching control process. To be more specific, when the target air-blowing temperature TAO is high, for example, 40 degrees Celsius, the controller 40 sets the foot mode. Meanwhile, when the target air-blowing temperature TAO is low, for example, lower than 25 degrees Celsius, the controller sets the vent mode. Moreover, when the target air-blowing temperature TAO is the temperature between the temperature for the foot mode and the temperature for the vent mode, the controller 40 sets the bi-level mode.

Moreover, during the cooling operation and the cooling and dehumidifying operation, the controller 40 performs a valve opening control process to control the valve opening of the condensing pressure regulating part of the first control valve 24. Now, the operation of the controller 40 for this process will be explained with reference to the flowchart shown in FIG. 7.

(Step S1)

Figure 7:
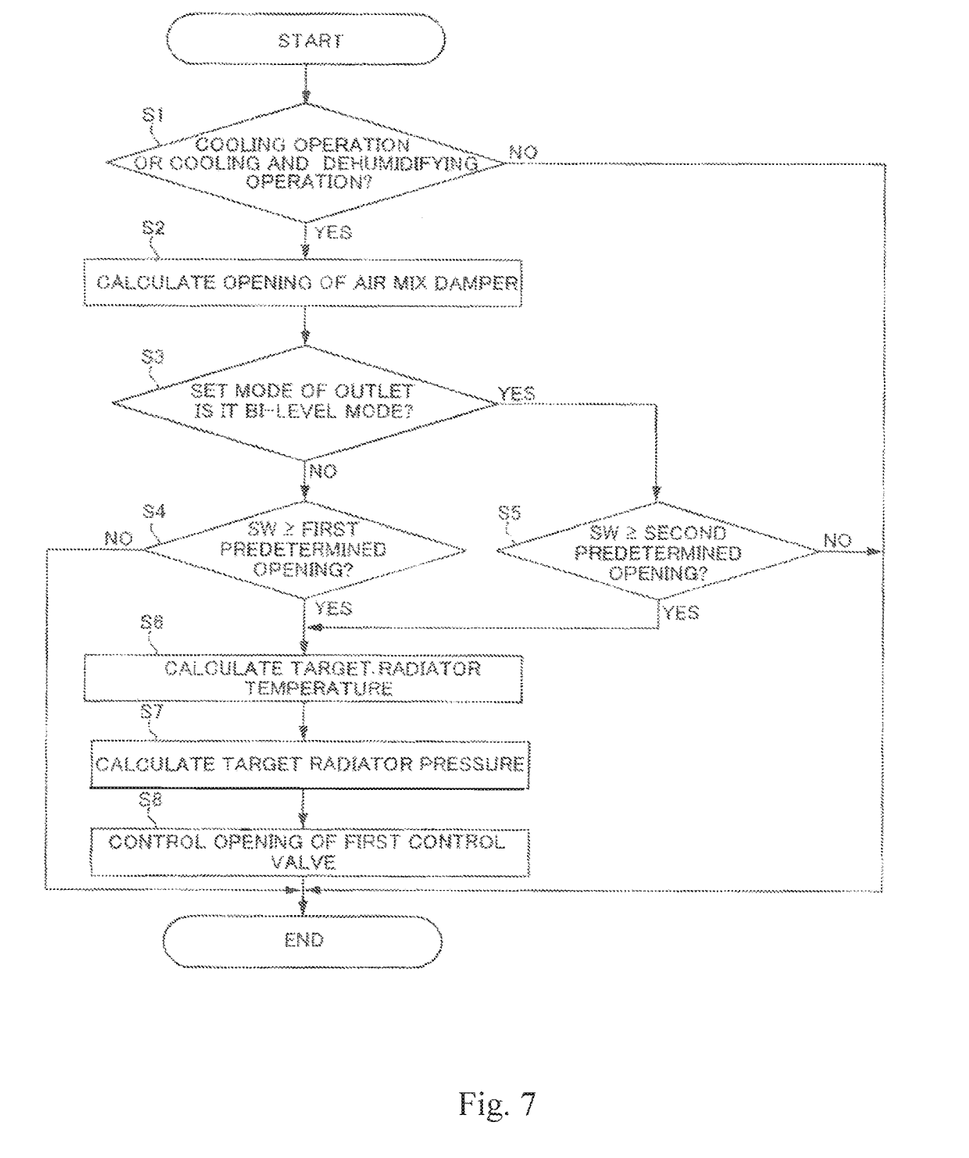
FIG. 7 is a flowchart showing a valve opening control process.

In step S1, the CPU determines whether the operation is the cooling operation or the cooling and dehumidifying operation. When determining that the operation is one of the cooling operation and the cooling and dehumidifying operation, the CPU moves the step to step S2. On the other hand, when determining that the operation is neither the cooling operation nor the cooling and dehumidifying operation, the CPU ends the valve opening control process.

(Step S2)

In the step S2, the CPU calculates opening SW of the air mix damper 16 based on the target air-blowing temperature TAO, the temperature TH detected by the heated temperature sensor 53, and the temperature Te detected by the cooled air temperature sensor 52 (opening calculation means). To be more specific, the opening SW of the air mix damper 16 is calculated as the following equation.

$$SW=(TAO-Te)/(TH-Te)$$

(Step S3)

In step S3, the CPU determines whether or not the foot outlet 11c, the vent outlet 11d and the defroster outlet 11e are set to the bi-level mode. When determining that each of the outlets 11c, 11d and 11e is not set to the bi-level mode, the CPU moves the step to step S4. On the other hand, determining that each of the outlets 11c, 11d and 11e is set to the bi-level mode, the CPU moves the step to step S5.

(Step S4)

When the CPU determines in the step S3 that each of the outlets 11c, 11d and 11e is not set to the bi-level mode, the CPU determines whether or not the calculated opening SW of the air mix damper 16 is equal to or more than a first predetermined opening (e.g. SW=1 (100%)) in the step 4. When determining that the opening SW is equal to or more than the first predetermined opening, the CPU moves the step to step S5. On the other hand, when determining that the opening SW is smaller than the first predetermined opening, the CPU ends the valve opening control process. Here, when the calculated opening SW is equal to or more than the first predetermined opening, the CPU determines that the quantity of heat release is not sufficient in the radiator 15. Here, the first predetermined opening is not limited to "1" but may be set to values within the range of 0.6 to 1 (60% to 100%).

(Step S5)

When the result of the determination in the step S3 is that each of the outlets 11c, 11d and 11e is set to the bi-level mode, the CPU determines whether or not the opening SW of the air mix damper 16 is equal to or more than a second predetermined opening (e.g. SW=0.7 (70%)) in step S5. When determining that the opening SW is equal to or more than the second predetermined opening, the CPU moves the step to the step S6. On the other hand, when determining that the opening SW is smaller than the second predetermined opening, the CPU ends the valve opening control process. Here, when the calculated opening SW is equal to or more than the second predetermined opening, the CPU determines that the quantity of heat release is not sufficient in the radiator 15. Here, the second predetermined opening is not limited to 0.7, but may be set to values within the range of 0.3 to 0.7 (30% to 70%).

(Step S6)

When determining that the opening 11b of the air mix damper 16 is equal to or more than the first predetermined value in the step S4, or, when determining that the opening SW of the air mix damper 16 is equal to or more than the second predetermined opening in the step S5, the CPU calculates target radiator temperature TCO, which is the temperature of the refrigerant in the radiator 15, based on the target air-blowing temperature TAO and the temperature Te detected by the cooled air temperature sensor 52 in the step S6 (target radiator temperature calculation means). The target radiator temperature TCO is calculated as the following equation.

$$TCO = TAO - Te + \alpha$$

Here, predetermined value α is a temperature corresponding to the quantity of heat that is lost because the air flows through the air flow passage 11.

(Step S7)

In step S7, the CPU calculates target radiator pressure PCO based on the target radiator temperature TCO calculated in the step S6. The target radiator pressure PCO is a pressure correspond rug to the target radiator temperature TCO when the refrigerant is saturated liquid, and may be calculated based on, for example, data of a p-h diagram.

(Step S8)

In step S8, the CPU calculates a target valve opening of the condensing pressure regulating part of the first control valve 24 to regulate the valve opening such that the pressure of the refrigerant in the radiator 15 is the target radiator pressure PCO calculated in the step S7, and then ends the valve opening control process. To be more specific, when determining that the amount of heating is not sufficient in the radiator 15 in the step S4 or the step S5, the CPU controls such that the valve opening of the condensing pressure regulating part of the first control valve 24 is smaller than when the amount of heating is sufficient in the radiator 15. Target valve opening TGECCV of the condensing pressure regulating part of the first control valve 24 is calculated as the following equation, based on feedback target value TGECCVFB and feedfoward target value TGECCVFF.

$$TGECCV = TGECCVFB + TGECCVFF$$

Figure 8:
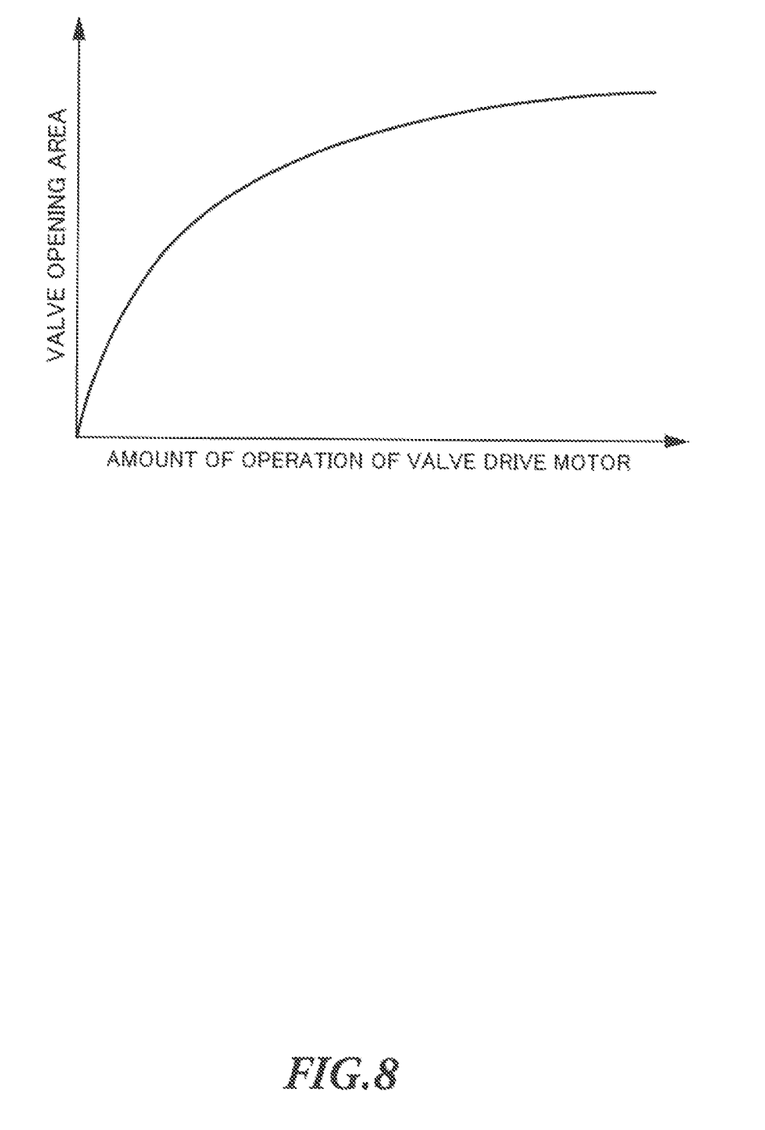
FIG. 8 shows a relationship between the amount of the operation of a drive motor and the opening area of the condensing pressure regulating part of the first control valve.

Here, the target feedback value TGECCVFB is an output value of proportional-plus-integral control (PI control), which is calculated based on the target radiator pressure PCO and the pressure Pd defected by the high-pressure sensor 49 (TGECCVFB=TGECCVfbp+TGECCVfbi, TGECCVfbp=Kp×(PCO−Pd), TGECCVfbi=TGECCVfbi_n−1+Ki×(PCO−Pd), Kp: constant as proportional gain, Ki: constant as integral gain, and TGECCVfbi_n−1: the previous value of TGECCVfbi). Meanwhile, the target, feedfoward value TGECCVFF is calculated based on the target radiator pressure PCO, the number of rotations Nc of the electric motor 21a of the compressor 21, the quantity of air Q supplied from the indoor fan 12, the outdoor temperature Tam, vehicle speed V, and voltage FANV of the electric motor 30a of the outdoor fan 30 (TGECCVFF=K1×PCO+K2×Nc+K3×Q+K4×Tam+K5×V+K6×FANV, and K1, K2, K3, K4, K5, K6 are preset constants, respectively). In addition, for the condensing pressure regulating part of the first control valve 24, a nonlinear relationship is held between the amount of the operation of a valve drive motor to move the valve body and the opening area of the refrigerant flow passage as shown in FIG. 8. Therefore, the valve opening of the condensing pressure regulating part of the first control valve 24 is controlled on the basis of the opening area of the refrigerant flow passage. Accordingly, the valve drive motor is operated with the amount of the operation to open and close the refrigerant flow passage for each predetermined area. In addition, when the nonlinear relationship is held between the amount of the operation of the valve drive motor to move the valve body and the opening area of the refrigerant flow passage, the amount of the operation of the valve drive motor may be determined based on an equation obtained by transforming the nonlinear system into a linear system.

In this way, with the vehicle air conditioning apparatus according to the present embodiment, the valve opening of the condensing pressure regulating part of the first control valve 24 is smaller when the calculated opening SW of the air mix damper 16 is equal to or more than the predetermined value than when the opening SW is smaller than the predetermined value. By this means, when the quantity of heat release is not sufficient in the radiator 15 during the cooling operation and the cooling and dehumidifying operation, it is possible to increase the condensing pressure of the refrigerant in the radiator 15 to raise the temperature in the radiator 15. Therefore, it is possible to secure the amount of heating, which is required to heat the air blowing to the vehicle interior, and to ensure that the temperature of the air supplied to the vehicle interior is a preset temperature.

In addition, the calculated opening SW of the air mix damper 16, which is used to determine that the quantity of heat release is not sufficient in the radiator 15 varies depending on the modes of the outlets 11c, 11d and 11e. By this means, it is possible to correctly determine that the quantity of heat release is not sufficient in the radiator 15 for each mode of the outlets 11c, 11d and 11e, and therefore to improve the control performance.

Moreover, the target radiator temperature TCO is calculated, which is the temperature of the refrigerant in the radiator 15 required to heat the air up to the target air-blowing temperature TAO. By this means, it is possible to regulate the valve opening of the condensing pressure regulating part of the first control valve 24 based on the target radiator temperature TCO, and therefore to improve the control performance.

Moreover, the valve opening of the condensing pressure regulating part of the first control valve 24 is calculated based on the target radiator pressure PCO obtained based on the target radiator temperature TCO and the pressure Pd detected by the high-pressure sensor 49, which is the actual temperature of the refrigerant in the radiator 15. By this means, it is possible to regulate the valve opening of the condensing pressure regulating part of the first control valve 24 such that the actual pressure of the refrigerant in the radiator 15 is the target radiator pressure PCO, and therefore to ensure that the quantity of heat release in the radiator 15 is optimized.

Moreover, the valve opening of the condensing pressure regulating part of the first control valve 24 is calculated based on the target feedfoward value TGECCVFF, which is calculated based on the target radiator pressure PCO, the target number of rotations Nc of the electric motor 21a of the compressor 21, the quantity of air Q supplied from the indoor fan 12, the outdoor temperature Tam, the vehicle speed V, and the voltage FANV of the electric motor 30a of the outdoor fan 30. By this means, it is possible to accurately calculate the valve opening of the condensing pressure regulating part of the first control valve 24, and therefore to improve the control performance.

The valve opening of the condensing pressure regulating part of the first control valve 24 is controlled on the basis of the opening area of the refrigerant flow passage, and the valve drive motor is operated with the amount of the operation to open and close the refrigerant flow passage for each predetermined area. By this means, even if a non-linear relationship is held between the amount of the operation of the valve drive motor to move the valve body and the opening area of the refrigerant flow passage, it is possible to correctly control the quantity of heat release in the radiator 15, and therefore to improve the control performance.

Here, with the present embodiment, a configuration has been described where the valve opening of the condensing pressure regulating part of the first control valve 24 is calculated based on the target radiator pressure PCO obtained based on the target radiator temperature TCO and the pressure Pd detected by the high-pressure sensor 49, which is the actual pressure of the refrigerant in the radiator 15. However, it is by no means limiting. For example, the valve opening of the condensing pressure regulating part of the first control valve 24 may be calculated based on the target radiator temperature TCO and the temperature detected by the high-temperature sensor 50, which is the actual temperature of the refrigerant in the radiator 15. Here, the actual temperature of the refrigerant in the radiator 15 is not limited to the actual measured value, which is the temperature detected by the high temperature sensor 50, but may be estimated based on at least the pressure of the refrigerant in the output side of the radiator 15 from which the refrigerant is discharged, among the pressure of the refrigerant in the output side of the radiator 15 from which the refrigerant is discharged; the temperature of the refrigerant in the output side of the radiator 15 from which the refrigerant is discharged; the opening of the air mix damper 16; and the temperature of the air after being cooled in the heat exchanger 14.

Here, with the present embodiment, a configuration has been described where, during the heating operation and the first heating and dehumidifying operation, the refrigerant having flowed out of the compressor 21 flows through the outdoor heat exchanger 22 from the first end side to the second end side. However, it is by no means limiting. For example, with another embodiment, during the heating operation and the first heating and dehumidifying operation, the refrigerant flowing out of the compressor 21 may flow through the outdoor heat exchanger 22 from the second end side to the first end side as shown in FIG. 9.

Figure 9:
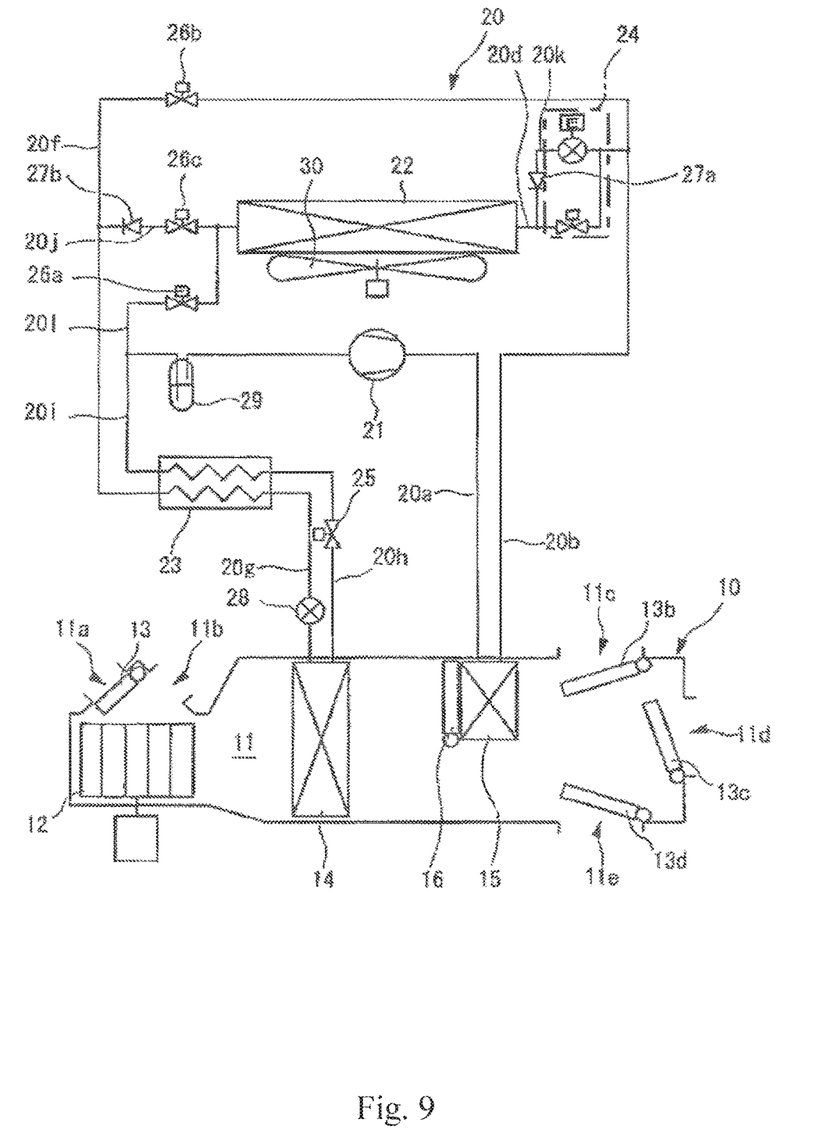
FIG. 9 is a schematic view showing a vehicle air conditioning apparatus according to another embodiment of the present invention.

In the vehicle air conditioning apparatus shown in FIG. 9, a refrigerant flow passage 20k is provided to connect between the output side of the expansion part of the first control valve 24 from which the refrigerant is discharged and the second end side of the outdoor heat exchanger 22, instead of the refrigerant flow passage 20c in the previous embodiment. In addition, in the vehicle air conditioning apparatus, a refrigerant flow passage 20l is provided to connect between the first end side of the outdoor heat exchanger 22 and the suction side of the compressor 21 into which the refrigerant is sucked, instead of the refrigerant flow passage 20e in the previous embodiment.

In the vehicle air conditioning apparatus having the above-described configuration, during the heating operation and the first heating and dehumidifying operation, the refrigerant flowing out of the radiator 15 flows through the outdoor heat exchanger 22 from the second end side to the first end side unlike the previous embodiment. During the other operations, the refrigerant flows in the same way as in the previous embodiment.

In addition, with the previous embodiment, a configuration baa been described where the first control valve 24 is constituted by the expansion part to decompress the refrigerant flowing into the outdoor heat exchanger 22 during the heating operation and the condensing pressure regulating part to regulate the condensing pressure of the refrigerant in the radiator 15 during the cooling and dehumidifying operation, which are integrally formed. However, it is by no means limiting. Another configuration is possible where, for example, an electronic expansion valve as the expansion part surd a condensing pressure regulating valve as the condensing pressure regulating part are connected in parallel to the upstream side of the outdoor heat exchanger 22 in the refrigerant flow direction. This provides the same effect as in the above-described embodiment.

Moreover, with the previous embodiment, the valve opening of the second control valve 25 can be switched between two different degrees, so that the second control valve 25 can regulate the amount of the refrigerant flowing through the refrigerant flow passage 20h between two levels. For example, another configuration is possible the valve opening of the second control valve 25 is set to any degree. In this case, it is possible to freely set the quantity of heat to be absorbed into the refrigerant in the heat exchanger 14, and therefore to improve the accuracy of the control of the quantity of heat to be absorbed into the refrigerant in the heat exchanger 14.

REFERENCE SIGNS LIST 10 air conditioning unit, 14 heat exchanger, 15 radiator, 20 refrigerant circuit, 21 compressor, 22 outdoor heat exchanger, 24 control valve, 25 second control valve, 26a to 26c frst to third solenoid valves, 27a and 27b first and second check valves, 28 expansion valve, 29 accumulator, 40 controller, 41 outdoor air temperature sensor, 42 indoor air temperature sensor, 43 insolation sensor, 44 heat exchanger temperature sensor, 45 suction pressure sensor, 46 suction temperature sensor, 47 discharge pressure sensor, 48 suction temperature sensor, 51 operation part, 52 cooled air temperature sensor, and 53 heated air temperature sensor.

The invention claimed is:

1. A vehicle air conditioning apparatus comprising:
a compressor configured to compress and discharge a refrigerant;
   a radiator provided in an air flow passage that allows air to be supplied to a vehicle interior to flow through and configured to release heat from the refrigerant;
   an indoor heat exchanger provided in the air flow passage in an upstream of air flow from the radiator and configured to absorb the heat into the refrigerant;
   an outdoor heat exchanger provided outside the vehicle and configured to release the heat from the refrigerant; and
   an air mix damper configured to be able to change a percentage of the air flowing through the air flow passage that is subjected to a heat exchange with the refrigerant flowing through the radiator, wherein:
   when a degree of an opening defined by movement of the air mix damper is increased, the percentage of the air subjected to the heat exchange with the refrigerant is increased; and
   the refrigerant discharged from the compressor releases the heat in the radiator and the outdoor heat exchanger while flowing first through the radiator, and next through the outdoor heat exchanger, and is decompressed by an expansion valve and absorbs the heat in the indoor heat exchanger, so that the air having been cooled in the indoor heat exchanger is heated in the radiator, and then supplied to the vehicle interior,
the vehicle air conditioning apparatus further comprising:
   a refrigerant flow regulating valve provided in a refrigerant flow passage between the radiator and the outdoor heat exchanger and configured to regulate an amount of the refrigerant flowing through the refrigerant flow passage;
   a target air-blowing temperature calculation part configured to calculate a target air-blowing temperature that is a temperature of the air to be supplied to the vehicle interior required to ensure that the temperature of the vehicle interior is a preset temperature;
   a heated air temperature detection part configured to detect a temperature of the air after being heated in the radiator;
   a cooled air temperature detection part configured to detect a temperature of the air after being cooled in the indoor heat exchanger;
   an opening calculation part configured to calculate the opening of the air mix damper, based on the temperature calculated by the target air-blowing temperature calculation part, the temperature detected by the heated air temperature detection part and the temperature detected by the cooled air temperature detection part;
   a valve opening control part configured to control a valve opening of the refrigerant flow regulating valve such that the valve opening of the refrigerant flow regulating valve is smaller when the valve opening calculated by the opening calculation part is equal to or more than a predetermined value than when the valve opening calculated by the opening calculation part is smaller than the predetermined value; and
   an outlet switching part configured to switch a mode among a vent mode to blow the air flowing through the air flow passage toward a head of a passenger in the vehicle interior, a foot mode to blow the air toward feet of the passenger in the vehicle interior, and a bi-level mode to blow the air toward the head and the feet of the passenger in the vehicle interior,
   wherein the predetermined value used by the opening calculation part varies depending on the mode set by the outlet switching part, and
   wherein, the opening calculation part is configured to use 100% as the predetermined value, in response to the mode set by the outlet switching part being the vent mode or the mode set by the outlet switching part being the foot mode.

2. The vehicle air conditioning apparatus according to claim 1, wherein the valve opening control part includes a target radiator temperature calculation part configured to calculate a target radiator temperature that is a temperature of the refrigerant in the radiator required to heat the temperature of the air supplied to the vehicle interior up to the target air-blowing temperature.

3. The vehicle air conditioning apparatus according to claim 2, further comprising a target radiator pressure calculation part configured to calculate a target pressure of the refrigerant in the radiator, based on the temperature calculated by the target radiator temperature calculation part, wherein the valve opening control part controls the valve opening based on the pressure calculated by the target radiator pressure calculation part and an actual radiator pressure that is an actual pressure of the refrigerant in the radiator.

4. The vehicle air conditioning apparatus according to claim 2, wherein the valve opening control part controls the valve opening based on the temperature calculated by the target radiator temperature calculation part and an actual radiator temperature that is an actual temperature of the refrigerant in the radiator.

5. The vehicle air conditioning apparatus according to claim 4, wherein the actual radiator temperature is calculated:
   (a) based on the pressure of the refrigerant in an output side of the radiator from which the refrigerant is discharged, or
   (b) based on:
      (i) the pressure of the refrigerant in an output side of the radiator from which the refrigerant is discharged, and
      (ii) at least one of the temperature of the refrigerant in the output side of the radiator from which the refrigerant is discharged; the opening of the air mix damper; and the temperature of the air after being cooled in the indoor heat exchanger.

6. The vehicle air conditioning apparatus according to claim 2, wherein the valve opening control part calculates a feedfoward value based on: the target radiator temperature; the target radiator pressure of the refrigerant in the radiator that is required to heat the temperature of the air supplied to the vehicle interior up to the target air-blowing temperature; a target number of rotations of the compressor that is required to heat the temperature of the air supplied to the vehicle interior up to the target air-blowing temperature; a quantity of air supplied from an indoor fan that flows the air through the air flow passage; an outdoor temperature; a vehicle speed; and a quantity of air supplied from an outdoor fan that flows the air subjected to a heat exchange with the refrigerant flowing through the outdoor heat exchanger.

7. The vehicle air conditioning apparatus according to claim 3, wherein the valve opening control part calculates a feedfoward value based on: the target radiator temperature; the target radiator pressure of the refrigerant in the radiator that is required to heat the temperature of the air supplied to the vehicle interior up to the target air-blowing temperature; a target number of rotations of the compressor that is required to heat the temperature of the air supplied to the vehicle interior up to the target air-blowing temperature; a quantity of air supplied from an indoor fan that flows the air through the air flow passage; an outdoor temperature; a vehicle speed; and a quantity of air supplied from an outdoor fan that flows the air subjected to a heat exchange with the refrigerant flowing through the outdoor heat exchanger.

8. The vehicle air conditioning apparatus according to claim 4, wherein the valve opening control part calculates a feedfoward value based on: the target radiator temperature; the target radiator pressure of the refrigerant in the radiator that is required to heat the temperature of the air supplied to the vehicle interior up to the target air-blowing temperature; a target number of rotations of the compressor that is required to heat the temperature of the air supplied to the vehicle interior up to the target air-blowing temperature; a quantity of air supplied from an indoor fan that flows the air through the air flow passage; an outdoor temperature; a vehicle speed; and a quantity of air supplied from an outdoor fan that flows the air subjected to a heat exchange with the refrigerant flowing through the outdoor heat exchanger.

9. The vehicle air conditioning apparatus according to claim 5, wherein the valve opening control part calculates a feedfoward value based on: the target radiator temperature; the target radiator pressure of the refrigerant in the radiator that is required to heat the temperature of the air supplied to the vehicle interior up to the target air-blowing temperature; a target number of rotations of the compressor that is required to heat the temperature of the air supplied to the vehicle interior up to the target air-blowing temperature; a quantity of air supplied from an indoor fan that flows the air through the air flow passage; an outdoor temperature; a vehicle speed; and a quantity of air supplied from an outdoor fan that flows the air subjected to a heat exchange with the refrigerant flowing through the outdoor heat exchanger.

10. The vehicle air conditioning apparatus according to claim 1, wherein the refrigerant flow regulating valve includes an operation part configured to control the valve opening; and wherein the valve opening control part controls the operation part with an amount of operation to open and close the refrigerant flow passage for each predetermined area, on a basis of an opening area of the refrigerant flow passage formed in the refrigerant flow regulating valve.

* * * * *